United States Patent
Thijssen (10) Patent No.: US 9,900,964 B2
(45) Date of Patent: Feb. 20, 2018

(54) RESETTING OF AN APPARATUS TO A FACTORY NEW STATE

(71) Applicant: PHILIPS LIGHTING HOLDING B.V., Eindhoven (NL)

(72) Inventor: Paulus Thomas Arnoldus Thijssen, Goirle (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/118,273

(22) PCT Filed: Feb. 6, 2015

(86) PCT No.: PCT/IB2015/050910
§ 371 (c)(1),
(2) Date: Aug. 11, 2016

(87) PCT Pub. No.: WO2015/121781
PCT Pub. Date: Aug. 20, 2015

(65) Prior Publication Data
US 2016/0360596 A1 Dec. 8, 2016

Related U.S. Application Data

(60) Provisional application No. 61/938,409, filed on Feb. 11, 2014.

(51) Int. Cl.
*H05B 37/02* (2006.01)
(52) U.S. Cl.
CPC ..... *H05B 37/0272* (2013.01); *H05B 37/0227* (2013.01)

(58) Field of Classification Search
CPC ................ H05B 37/02; H05B 37/0272; H05B 33/0815; H05B 33/0845; H05B 37/0218;
(Continued)

(56) References Cited

U.S. PATENT DOCUMENTS

2008/0136663 A1* 6/2008 Courtney ........... H05B 37/0272
340/4.3
2008/0297068 A1 12/2008 Koren et al.
(Continued)

FOREIGN PATENT DOCUMENTS

GB 2498371 A 7/2013
JP 2001052880 A 2/2001
(Continued)

OTHER PUBLICATIONS

"Application Note, Atmel AT06482: Real Color ZLL LED Light Bulb With ATMEGA256RFR2—Software User's Guide, Atmel AVR 8-Bit Microcontroller," Jan. 2014 (19 pages).
(Continued)

*Primary Examiner* — Douglas W Owens
*Assistant Examiner* — Wei Chan
(74) *Attorney, Agent, or Firm* — Meenakshy Chakravorty (57) ABSTRACT

Methods and apparatus for resetting of an apparatus to a factory new state are disclosed. For example, some aspects of the disclosure are directed to monitoring the position of a user interface element (124, 124A1, 124A2, 124B) of a lighting apparatus (120) and resetting the lighting apparatus to a factory new state based on the monitored position. Also, for example, some aspects of the disclosure are directed to monitoring a power signal associated with the lighting apparatus, and resetting the lighting apparatus to a factory new state based on the monitored power signal.

13 Claims, 3 Drawing Sheets

(58) Field of Classification Search
CPC .... H05B 39/048; H05B 39/04; H05B 41/295; H05B 33/0851; H05B 37/0227; H05B 37/0281
USPC ... 315/246, 158, 224, 307, 200 R, 287, 291, 315/129; 340/12.5, 3.51, 9.1, 12.54
See application file for complete search history.

(56) References Cited

U.S. PATENT DOCUMENTS

| | | |
|---|---|---|
| 2012/0007525 A1 | 1/2012 | Cho et al. |
| 2012/0260076 A1 | 10/2012 | Liu et al. |
| 2013/0147395 A1 | 6/2013 | Cook |
| 2013/0200814 A1 | 8/2013 | Chen et al. |

FOREIGN PATENT DOCUMENTS

| | | |
|---|---|---|
| WO | 2008030317 A1 | 3/2008 |
| WO | 2008078256 A2 | 7/2008 |
| WO | 2010095087 A1 | 8/2010 |
| WO | 2012090116 A1 | 7/2012 |
| WO | 2013067569 A1 | 5/2013 |
| WO | 2013163682 A1 | 11/2013 |

OTHER PUBLICATIONS

"Application Note, Atmel AVR2060: Bitcloud Zigbee Light Link Quick Start Guide, Atmel 8-Bit Microcontrollers," Apr. 2013 (24 Pages).

* cited by examiner

FIG. 4

RESETTING OF AN APPARATUS TO A FACTORY NEW STATE

CROSS-REFERENCE TO PRIOR APPLICATIONS

This application is the U.S. National Phase application under 35 U.S.C. § 371 of International Application No. PCT/IB2015/050910, filed on Feb. 6, 2015, which claims the benefit of U.S. patent application Ser. No. 61/938,409, filed on Feb. 11, 2014. These applications are hereby incorporated by reference herein.

TECHNICAL FIELD

The present invention is directed generally to the resetting of an apparatus to a factory new state. More particularly, various inventive methods and apparatus disclosed herein relate to monitoring the position of a user interface element of a lighting apparatus and/or a power signal associated with the lighting apparatus, and resetting the lighting apparatus to a factory new state based on the monitored position and/or power signal.

BACKGROUND

ZigBee is a standards-based wireless technology built around the IEEE 802.15.4 wireless protocol. ZigBee is generally designed to address the needs of low-cost, low-power wireless sensor and control networks. ZigBee's set of specifications enables creation of wireless personal area networks built from small, low-power electronic devices. Generally, ZigBee supports two ways for apparatus to join a network: (1) "Touch Link", which is used as part of ZigBee Light Link (ZLL) and (2) a so-called "Classical Join," where an apparatus having a default (i.e., an original) factory new state, tries to connect to a new network when the apparatus is powered.

Recent technologies utilize ZigBee and/or other protocols to set up a wireless personal lighting network and control various aspects of LED-based lighting. Such technologies bring vast possibilities to help users personalize lighting to suit their needs and/or lifestyles. Various lighting apparatus may be connected to the lighting networks such as LED-based bulbs, LED-based lighting fixtures, other light sources, switches for controlling one or more aspects of the lighting networks, presence sensors for controlling one or more aspects of the lighting networks, etc. When Classical Join is one of (or the sole) approach that has been selected to include new lighting apparatus in the lighting network, the lighting apparatus must be in the factory new state in order to join the network under such approach.

To allow lighting apparatus that are not in a factory new state to join a network under a Classical Join approach, it needs to be possible to reset those lighting apparatus to the factory new state. Some lighting apparatus may implement a "remote reset" feature to reset the device to the factory new state. For example, a specific code may be printed on a lighting apparatus and a user may enter the code via a tablet, smart phone, or other computing device. The computing device may then cause the code to be sent over the network (e.g., via a network bridge) to the lighting apparatus via a manufacturer specific ZigBee inter-PAN (personal area network) command, and the lighting apparatus may respond to the ZigBee inter-PAN command by resetting to the factory new state.

This and/or other techniques of resetting a device to the factory new state may suffer from one or more drawbacks. For example, where a network bridge is present in the lighting network, the bridge must be aware of the manufacturer specific inter-PAN command. Also, for example, a manufacturer specific inter-PAN command may be proprietary to the manufacturer and the manufacturer may not desire to disclose the inter-PAN command to third parties to enable its use in third party devices that are connectable to the lighting network.

Thus, there is a need in the art to provide alternative techniques for resetting of lighting apparatus to a factory new state.

SUMMARY

The present disclosure is directed to inventive methods and apparatus for resetting of an apparatus to a factory new state. For example, some aspects of the disclosure are directed to monitoring the position of a user interface element of a lighting apparatus and resetting the lighting apparatus to a factory new state based on the monitored position. The user interface element may be actuable between at least a first position and a second position and may be located on the lighting apparatus in a position that is inconvenient and/or impossible to access by a human when the lighting apparatus is installed. Also, for example, some aspects of the disclosure are directed to monitoring a power signal associated with the lighting apparatus, and resetting the lighting apparatus to a factory new state based on the monitored power signal. For instance, the lighting apparatus may be reset to a factory new state when a number of on/off cycles of power provided to the lighting apparatus within a time period satisfies a threshold.

In one aspect, a lighting apparatus is provided that includes a communications module, a controller, and a user interface element. The controller is programmed to attempt a ZigBee factory new connection to a network via the communications module when a factory new status is in a set state and to not attempt the factory new connection when the factory new status is not in the set state. The user interface element is coupled to the controller and is physically actuable between at least a first position and a second position. When the factory new status is not in the set state the controller is further programmed to change the factory new status to the set state when the controller senses the user interface element is in the second position following disconnection of the lighting apparatus from mains power.

In some embodiments, the user interface element is located on the lighting apparatus in a position that is inaccessible to a human when the lighting apparatus is installed. In some of those embodiments, the lighting apparatus is a light switch or a presence sensor.

In some embodiments, the lighting apparatus further includes an energy storage device. The energy storage device powers the controller when the lighting apparatus is disconnected from mains power and the controller senses the user interface element is in the second position when the lighting apparatus is disconnected from mains power based on actuation of the user interface element to the second position when the lighting apparatus is disconnected from mains power. In some of those embodiments, the energy storage device is a capacitor. In some of those embodiments, the user interface element is a push button that is biased to the first position.

In some embodiments, the lighting apparatus further includes a non-volatile memory and the controller senses the user interface element is in the first position prior to the lighting apparatus being disconnected from mains power and stores an indication of the first position in the non-volatile memory. The controller further senses the user interface element is in the second position when the lighting apparatus is reconnected to mains power and changes the factory new condition to the set state based on determining the second position is different from the indication stored in the non-volatile memory. In some of those embodiments, the user interface element is a dip switch.

In another aspect, a method of managing connection of an apparatus to a network is provided that includes: connecting an apparatus to a network when a factory new status is in a set state; changing the factory new status to not be in the set state in response to connecting to the network; sensing a change in the position of a user interface element following disconnection of the apparatus from mains power, the user interface element being part of the apparatus and being actuable between a plurality of positions; and changing the factory new condition back to the set state in response to sensing the change in the position of the user interface element following disconnection of the apparatus from mains power.

In some embodiments, the user interface element is located on the lighting apparatus in a position that is inaccessible to a human when the lighting apparatus is installed.

In some embodiments, the method further includes receiving power from an energy storage device of the apparatus when the lighting apparatus is disconnected from mains power; wherein sensing the change in the position of the user interface element following disconnection of the apparatus from mains power comprises sensing the change in the position of the user interface element when the apparatus is disconnected from mains power.

In some embodiments, the method further includes: sensing the position of the user interface element prior to the apparatus being disconnected from mains power; and storing an indication of the position of the user interface element prior to the apparatus being disconnected from mains power; wherein sensing the change in the position of the user interface element following disconnection of the apparatus from mains power comprises determining the position of the user interface element when the apparatus is reconnected to mains power is different from the stored indication of the position of the user interface element prior to the apparatus being disconnected from mains power.

In yet another aspect, a lighting apparatus is provided that includes a communications module and a controller. The controller is programmed to attempt a ZigBee factory new connection to a network via the communications module when a factory new status is in a set state and to not attempt the new connection when the factory new status is not in the set state. When the factory new condition is not in the set state the controller is further programmed to monitor a number of on/off cycles of power provided to the lighting apparatus within a time period and change the factory new status to the set state when the number of on/off cycles satisfies a threshold.

In yet another aspect, a method of managing connection of an apparatus to a network is provided that includes: connecting an apparatus to a network when a factory new status is in a set state; changing the factory new status to not be in the set state in response to connecting to the ZigBee network; monitoring a number of on/off cycles of power provided to the apparatus within a time period; and changing the factory new status to the set state when the number of on/off cycles satisfies a threshold.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one embodiment of an LED configured to generate essentially white light (e.g., a white LED) may include a number of dies which respectively emit different spectra of electroluminescence that, in combination, mix to form essentially white light. In another embodiment, a white light LED may be associated with a phosphor material that converts electroluminescence having a first spectrum to a different second spectrum. In one example of this embodiment, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an embodiment or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more lighting apparatus such as, for example, the operation of one or more light source(s), wall switch(es), motion sensor(s), etc. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various embodiments, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some embodiments, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a presence sensor, a wall switch, a controller or processor associated with one or more light sources or lighting units, other lighting apparatus, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network embodiment, one or more devices coupled to a network may serve as a controller for one or more other devices coupled to the network (e.g., in a master/slave relationship). In another embodiment, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various embodiments of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

ZigBee supports two ways for apparatus to join a network—(a) Touch Link, which is used as part of ZigBee Light Link (ZLL) and a so-called "Classical Join," where an apparatus having an original factory new state, tries to connect to a new network when the apparatus is powered. Recent technologies utilize ZigBee and/or other protocols to set up a wireless personal lighting network and control various aspects of LED-based lighting. When Classical Join is one of (or the sole) mechanism that has been selected to include new lighting apparatus in the lighting network, the lighting apparatus must be in the factory new state in order to join the network under such approach.

To allow lighting apparatus that are not in a factory new state to join a network with Classical Join, it needs to be possible to reset those lighting apparatus to the factory new state. Some lighting apparatus may implement a "remote reset" feature to reset the device to the factory new state. However, this and/or other techniques of resetting a device to the factory new state may suffer from one or more drawbacks. For example, in using remote reset, a manufacturer specific inter-PAN command must be used that is proprietary to the manufacturer and the manufacturer may not desire to disclose the inter-PAN command to third parties to enable its use in third party devices that are connectable to the lighting network.

Thus, Applicants have recognized and appreciated that it would be beneficial to provide alternative techniques for resetting of lighting apparatus to a factory new state. For example, Applicants have recognized and appreciated that it would be beneficial to monitor the position of a user interface element of a lighting apparatus and/or a power signal associated with the lighting apparatus, and reset the lighting apparatus to a factory new state based on the monitored position and/or power signal.

Figure 1:
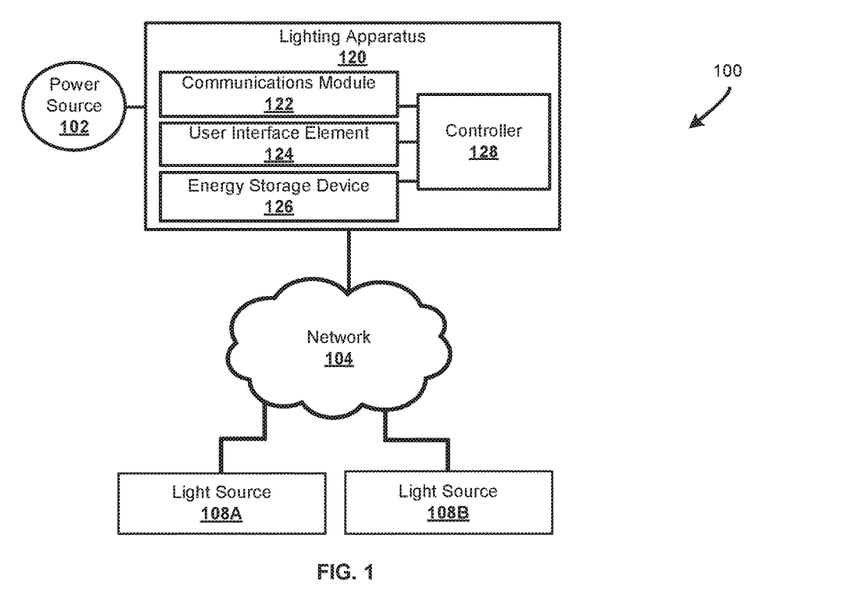
FIG. 1 illustrates an example environment in which an apparatus may be reset to a factory new state.

FIG. 1 illustrates an example environment 100 in which an apparatus may be reset to a factory new state. The example environment includes a network 104, such as a personal lighting network, that facilitates communication between various components in the environment. The example environment also includes a lighting apparatus 120, a power source 102 providing power to the lighting apparatus 120, and light sources 108A and 108B. In some embodiments, the network 104 may include a bridge that communicates with various lighting apparatus and/or other apparatus via ZigBee and communicates with one or more computing devices (e.g., a tablet, a smartphone) and/or other apparatus via a router and/or the Internet, optionally utilizing other protocols. In various embodiments, one or more of the various lighting apparatus of the example environment 100 (i.e., lighting apparatus 120, light source 108A, light source 108B) may optionally communicate directly with one another and/or communicate with the network 104 via one or more other lighting apparatus. For example, in some embodiments the lighting apparatus 120 may communicate with a bridge of the network 104 via the light source 108A.

Additional and/or alternative apparatus may optionally be present in the example environment 100, such as additional light sources, additional non-light source lighting apparatus, one or more computing devices utilized to control other components of the environment 100, etc. For example, in various embodiments a computing device may be connected to the network 104 and a user may utilize the computing device to control light output produced by light sources 108A and 108B, the functionality of lighting apparatus 120, and/or other aspects of the example environment 100.

In some embodiments, the lighting apparatus 120 may be a wall switch that includes one or more user interface elements to receive input from a user and control one or more aspects of the light sources 108A, 108B based on the input. For example, the wall switch may contain one or more "scene" selection user interface elements that, when actuated, cause the light sources 108A, 108B and/or other light sources to adapt their color, light output level, and/or other parameters to the selected scene. In some embodiments, the lighting apparatus 120 may additionally and/or alternatively be a presence sensor that senses the presence of individuals. For example, the presence sensor may be incorporated as part of a wall switch and/or in a wall plate. The presence sensor may provide an indication of whether other individuals are present and the light sources 108A, 108B and/or one or more other components adjusted based on such indication. In some embodiments, the lighting apparatus 120 may be a light source, such as an LED-based light source, or a lighting fixture, such as an LED-based lighting fixture. Additional and/or alternative lighting apparatus may be provided that incorporate components and functionality described herein to enable resetting of the lighting apparatus to a factory new state.

The lighting apparatus 120 includes a communications module 122, a user interface element 124, an energy storage device 126, and a controller 128. In various embodiments the energy storage device 126 and/or the user interface element 124 may be omitted. For example, the energy storage device 126 may optionally be omitted when the lighting apparatus 120 performs the example method of FIG. 2 described below. Also, for example, the user interface element 124 may optionally be omitted when the lighting apparatus 120 performs the example method of FIG. 4 described below.

Generally, the communications module 122 receives and transmits data over the network 104 (optionally via other components as described herein). For example, the communications module 122 may receive and/or transmit data via ZigBee that enables the lighting apparatus 120 to join the network 104, may receive commands to control the functionality of one or more aspects of the lighting apparatus 120, and/or may transmit commands to control the functionality of one or more aspects of other components of the example environment 100. The controller 128 may process the commands received via the communications module 122 and may also direct the commands that are sent by the communications module 122.

The user interface element 124 is physically actuable between at least a first position and a second position. The user interface element 124 is electrically coupled to the controller 128 and the controller 128 can ascertain, via the electrical coupling, when the user interface element 124 is in at least one of the first position and the second position (and optionally other position(s)). In some embodiments, the user interface element 124 may be an electrical switch such as a dip switch or a push-button switch (biased or unbiased) and the controller 128 can ascertain whether the switch is on or off. Other user interface elements may be utilized such as potentiometers, dials, sliders, and other types of sensors that may receive some form of human-generated stimulus and generate a signal in response thereto.

The energy storage device 126 may be a capacitor, a battery, or other device capable of storing electrical energy and discharging the electrical energy for a period of time. The energy storage device 126 may be charged via input power provided by power source 102 and the energy storage device 126 may power at least the controller 128 for a period of time (dependent on the charge) when the power source 102 is disconnected from the lighting apparatus 120.

The controller 128 performs various functions such as processing the commands received via the communications module 122 and determining which commands are sent via the communications module 122. The controller 128 may also perform various functions related to the lighting apparatus 120. For example, where the lighting apparatus is a presence sensor, the controller 128 may receive signals from a passive infrared (PIR) sensor or other motion sensor and determine whether a human is present based on such signals.

Figure 2:
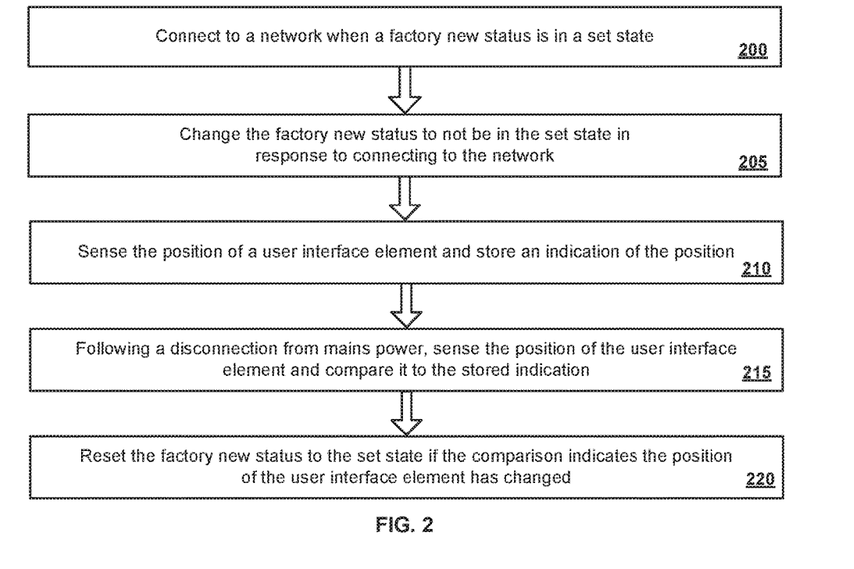
FIG. 2 is a flow chart illustrating an example of resetting an apparatus to a factory new state.
Figure 3:
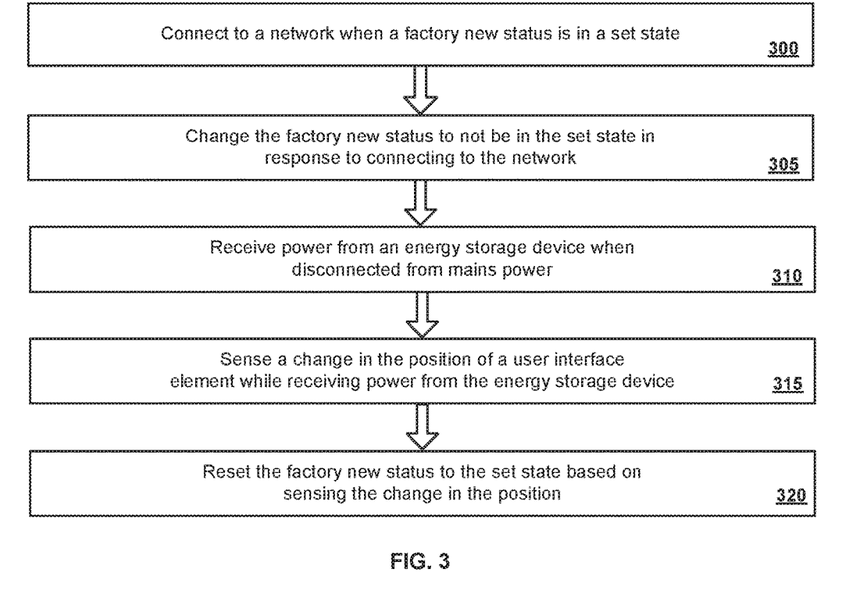
FIG. 3 is a flow chart illustrating another example of resetting an apparatus to a factory new state.
Figure 4:
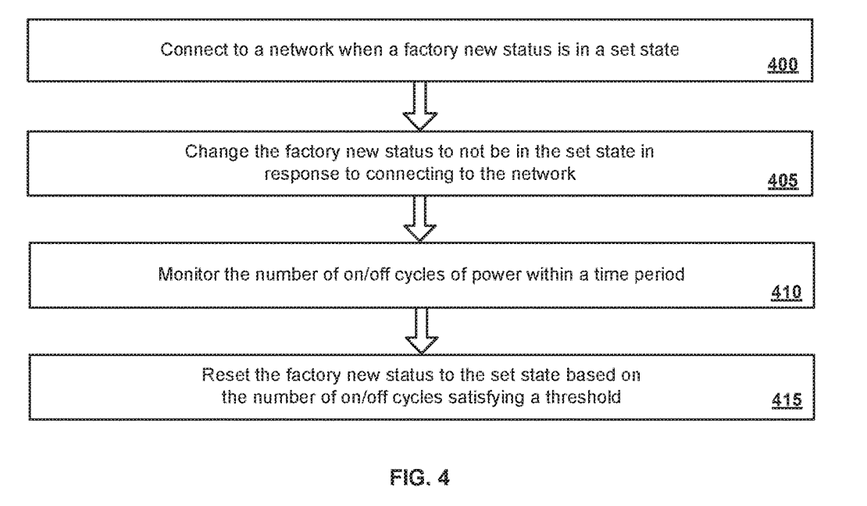
FIG. 4 is a flow chart illustrating yet another example of resetting an apparatus to a factory new state.

As described herein, the controller 128 also resets the lighting apparatus to a factory new state in certain situations. With reference to FIGS. 2-4, examples of the controller 128 resetting the lighting apparatus to a factory new state are provided. While operations of the methods of FIGS. 2-4 are shown in a particular order, this is not meant to be limiting. One or more operations may be reordered, omitted, or added.

FIG. 2 is a flow chart illustrating an example of resetting an apparatus to a factory new state. At step 200, an apparatus is connected to a network when a factory new status of the apparatus is in a set state. For example, the lighting apparatus 120 may be connected to power source 102 and the controller 128 of the lighting apparatus 120 may send and/or receive data via communications module 122 that enable the lighting apparatus 120 to join the network 104. A set state of a factory new status for an apparatus indicates that one or more settings of the apparatus are in a state that enables the apparatus to join a network under the Classical Join approach of the ZigBee standard. A factory new status may be in a set state, for example, when the apparatus is in a new "out of the box" condition and/or when the method of FIG. 2, 3, or 4 has been previously performed. The factory new status may be indicated, for example, by one or more settings that are editable by the controller 128 and stored in non-volatile or other memory associated with the controller 128, such as memory that may be included in the lighting apparatus and coupled to the controller 128.

At step 205, the factory new status is changed to not be in the set state in response to connecting to the network. A factory new status for an apparatus not being in the set state indicates that one or more settings of the apparatus are in a state that prevents the apparatus from joining a network under the Classical Join approach of the ZigBee standard. The factory new status may be changed to not be in the set state, for example, by the controller 128 altering one or more settings stored in memory associated with the controller 128. The controller 128 may alter the one or more settings in response to connecting to the network at step 200.

At step 210, the position of a user interface element is sensed and an indication of the position is stored. For example, the position of user interface element 124 of the lighting apparatus 120 may be sensed by the controller 128 and the position stored by the controller 128 in memory that is included in the lighting apparatus 120 and coupled to the controller 128. Also, for example, the position may additionally or alternatively be stored by the controller 128 in memory that is remote from the lighting apparatus, such as memory included in a bridge of network 104. In some embodiments, the controller 128 may sense the position of the user interface element 124 at, or shortly after (e.g., within 30, 15, or 5 seconds) the time power is provided to the lighting apparatus via power source 102. For example, when the lighting apparatus 120 is initially installed and power is provided by power source 102, the controller 128 may sense the position of the user interface element 124 and store an indication of the position in memory. In some embodiments, the controller 128 may additionally or alternatively sense the position of the user interface element 124 continuously, periodically, or at other regular or non-regular intervals. In some embodiments of the method of FIG. 2, the user interface element 124 may be a switch that may be fixedly set in any one of two or more positions. For example, the user interface element 124 may be a dip switch, a toggle switch, etc.

At step 215, the position of the user interface element is sensed following disconnection of the apparatus from mains power, and the position is compared to the indication stored at step 210. For example, when the lighting apparatus 120 is a light switch, it may be disconnected from mains power due to, for example, a user switching a breaker that powers the lighting apparatus 120, a power loss, etc. For instance, a user may switch a breaker that powers the light switch and partially or fully uninstall the light switch to access the user interface element and change its position to reset the light switch to a factory new position. Also, for example, when the lighting apparatus 120 is a light source, a user may actuate a switch (e.g., an on/off wall switch) to an off position to disconnect the light source from mains power.

In some embodiments, the controller 128 may sense the position of the user interface element 124 at, or shortly after (e.g., within 30, 15, or 5 seconds) the time power is again provided to the lighting apparatus 120 via power source 102 following disconnection. In some embodiments where lighting apparatus 120 includes energy storage device 126, the controller 128 may be powered by the energy storage device 126 when power is disconnected and may optionally sense the position (periodically, continuously, or at a set time) of the user interface element 124 while the lighting apparatus 120 is disconnected from power source 102. The controller 128 compares the position sensed following disconnection of the lighting apparatus 120 from mains power to the indication of the position that was stored at step 210 and determines whether the position has changed or the position remains the same.

At step 220, the factory new status is reset to the set state if the comparison of step 215 indicates the position of the user interface element has changed. For example, the controller 128 may reset the factory new status of the lighting apparatus 120, and the controller 128 may then again repeat the steps of FIG. 2 (and optionally other steps such as those related to control of the lighting apparatus 120).

FIG. 3 is a flow chart illustrating another example of resetting an apparatus to a factory new state. At step 300, an apparatus is connected to a network when a factory new status of the apparatus is in a set state. For example, the lighting apparatus 120 may be connected to power source 102 and the controller 128 of the lighting apparatus 120 may send and/or receive data via communications module 122 that enable the lighting apparatus 120 to join the network 104. Step 300 may share one or more aspects in common with step 200 of FIG. 2.

At step 305, the factory new status is changed to not be in the set state in response to connecting to the network. The factory new status may be changed to not be in the set state, for example, by the controller 128 altering one or more settings stored in memory associated with the controller 128. Step 305 may share one or more aspects in common with step 205 of FIG. 2.

At step 310, power is received from an energy storage device when the apparatus is disconnected from mains power. For example, the energy storage device 126 may provide power to the controller 128 when the lighting apparatus is disconnected from the power source 102. For instance, when the lighting apparatus 120 is a light switch, it may be disconnected from mains power due to, for example, a user switching a breaker that powers the lighting apparatus 120, a power loss, etc. Also, for example, when the lighting apparatus 120 is a light source, a user may actuate a switch (e.g., an on/off wall switch) to an off position to disconnect the light source from mains power.

At step 315, a change in the position of a user interface element is sensed while receiving power from the energy storage device (and while the apparatus is disconnected from the mains power). For example, the controller 128 may monitor the position of the user interface element 124 and determine when a change in the position of the user interface element 124 occurs. In some embodiments of the method of FIG. 3, the user interface element 124 may be a biased push button and the change in the position may be determined based on a user pushing the push button, which causes the push button to move from a first position to a second position, and then back to the first position (due to a biasing spring or other biasing element). In some embodiments of the method of FIG. 3, the user interface element 124 may be a switch that may be fixedly set in any one of two or more positions. For example, the user interface element 124 may be a dip switch, a toggle switch, etc.

At step 320, the factory new status is reset to the set state based on sensing the change of the position of the user interface element at step 315. For example, the controller 128 may reset the factory new status of the lighting apparatus 120, and the controller 128 may then again repeat the steps of FIG. 3 (and optionally other steps such as those related to control of the lighting apparatus 120). In some embodiments, the controller 128 may reset the factory new status of the lighting apparatus 120 while being powered by energy storage device 126. In some embodiments, the controller 128 may wait until the lighting apparatus is again connected to power source 102, or another power source, before resetting the factory new status. For example, the controller 128 may store a flag in memory that indicates the lighting apparatus 120 is to be reset to factory new status when the lighting apparatus 120 is again connected to a power source.

FIG. 4 is a flow chart illustrating yet another example of resetting an apparatus to a factory new state. At step 400, an apparatus is connected to a network when a factory new status of the apparatus is in a set state. For example, the lighting apparatus 120 may be connected to power source 102 and the controller 128 of the lighting apparatus 120 may send and/or receive data via communications module 122 that enable the lighting apparatus 120 to join the network 104. Step 400 may share one or more aspects in common with step 300 of FIG. 3 and step 200 of FIG. 2.

At step 405, the factory new status is changed to not be in the set state in response to connecting to the network. The factory new status may be changed to not be in the set state, for example, by the controller 128 altering one or more settings stored in memory associated with the controller 128. Step 405 may share one or more aspects in common with step 305 of FIG. 3 and step 205 of FIG. 2.

At step 410, a number of on/off cycles of power within a time period is monitored. For example, where the lighting apparatus 120 is a light source, the controller 128 may monitor the number of on/off cycles of power due to a user actuating a switch that removes and/or reapplies power source 102, or otherwise cycling the power. Also, for example, where the lighting apparatus 120 is a light switch, the controller 128 may monitor the number of on/off cycles of power routed through the light switch (due to actuation of the light switch) and/or the number of cycles of power supplied to the light switch due to a user cycling an electrical breaker associated with the light switch and/or otherwise cycling the power. In some embodiments, monitoring the number of on/off cycles within a time period includes monitoring the number of cycles that occur within a predetermined time of a first on/off cycle. For example, the number of cycles that occur within 10, 20, or 30 second of a first on/off cycle. In some embodiments, monitoring the number of on/off cycles within a time period includes monitoring the number of on/off cycles that occur within a time period of one another. For example the number of consecutive cycles that occur within 2, 5, or 10 seconds of one another. In some embodiments of the method of FIG. 4, the energy storage device 126 may provide power to the controller 128 to enable the controller to maintain a count of the number of on/off cycles while power source 102 is not being supplied to the lighting apparatus 120. In some embodiments of the method of FIG. 4, the controller 128 may additionally or alternatively store indications of a power cycle, and optionally a time indication for each power cycle, in memory that is included in the lighting apparatus 120 and coupled to the controller 128 and/or in memory that is remote from the lighting apparatus, such as memory included in a bridge of network 104.

At step 415, the factory new status is reset to the set state based on the number of on/off cycles of step 410 satisfying a threshold. For example, the controller 128 may reset the factory new status of the lighting apparatus 120 when the number of on/off cycles satisfies a threshold such as 3 or 5, and the controller 128 may then again repeat the steps of FIG. 4 (and optionally other steps such as those related to control of the lighting apparatus 120). In some embodiments, the controller 128 may reset the factory new status of the lighting apparatus 120 while being powered by energy storage device 126. In some embodiments, the controller 128 may wait until the lighting apparatus is again connected to power source 102, or another power source, before resetting the factory new status. For example, the controller 128 may store a flag in memory that indicates the lighting apparatus 120 is to be reset to factory new status when the lighting apparatus is again connected to a power source. In some embodiments, the controller 128 may wait at least a threshold time period after power has been restored before resetting the factory new status of the lighting apparatus, to minimize the likelihood the resetting will be interrupted by another on/off cycle. For example, if the threshold is 5 on/off cycles, a user may actually cycle the power on/off 7 times. By waiting at least a threshold time period, such as 10 seconds, the controller may not reset the factory new status until 10 seconds after the seventh on/off cycle (although determining to reset the factory new status after the fifth on/off cycle).

Figure 5A:
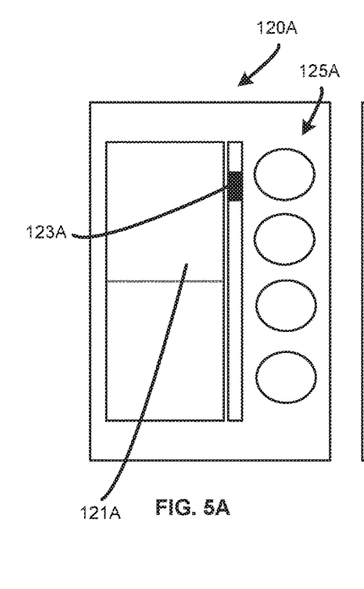
FIG. 5A is a front view of a light switch lighting apparatus that is configured to be reset to a factory new state according to various embodiments described herein.

FIG. 5A is a front view of a light switch lighting apparatus 120A that is configured to be reset to a factory new state according to various embodiments described herein. The front view of FIG. 5A illustrates a front face of the light switch lighting apparatus 120A that would face a user when installed. The front face includes a toggle switch 121A that may be toggled on/off to remove or apply power to one or more light sources such as light sources that are on the same electrical circuit as the light switch lighting apparatus 120A and/or other light sources on the same personal lighting network. The front face also includes a dimmer slide 123A that may be adjusted vertically to control a dimming level of one or more light sources such as those on the same personal lighting network as the light switch lighting apparatus 120A1. The front face further includes four vertically stacked scene selection buttons 125A. Each scene selection button 125A may, when selected, cause particular lighting characteristics to be generated by one or more light sources such as those on the same personal lighting network as the light switch lighting apparatus 120A.

Figure 5B:
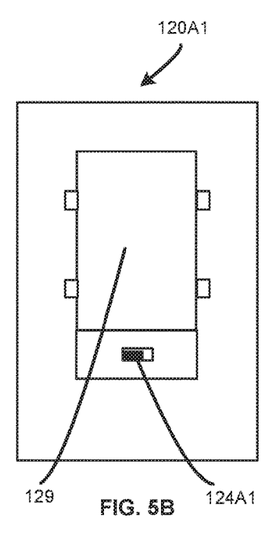
FIG. 5B is a rear view of one embodiment of the light switch of FIG. 5A.

FIG. 5B is a rear view of one embodiment 120A1 of the light switch of FIG. 5A. The rear view of FIG. 5B illustrates a rear portion of the light switch lighting apparatus that would be inaccessible to a user when installed. For example, when installed the front face would be flush against a wall and would prevent access to the rear portion, which may be at least partially recessed within the wall. The rear portion includes an electrical block 129 to which mains power may be connected, and optionally routed to other electrical devices. The rear portion also includes user interface element 124A1 which, in the embodiment of FIG. 5B is a dip switch that is switched to a "left position". The housing on which the user interface element 124A1 is provided may also optionally house one or more additional components such as a controller and a communications module. To reset the light switch in the embodiment 120A1 of FIG. 5B, a user may, after the light switch has been connected to mains power, remove the light switch from mains power and switch the user interface element 124A1 to the "right position". The controller of the light switch may recognize this switch and reset the light switch to the factory new state as described, for example, with respect to FIG. 2.

Figure 5C:
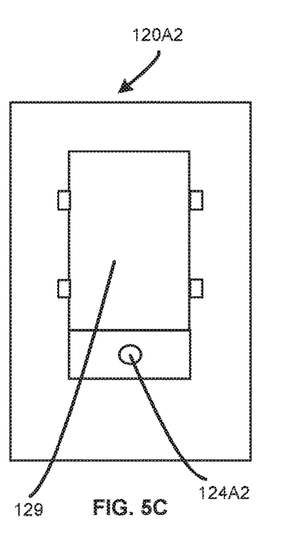
FIG. 5C is a rear view of another embodiment of the light switch of FIG. 5A.

FIG. 5C is a rear view of another embodiment 120A2 of the light switch of FIG. 5A. The rear view of FIG. 5C illustrates a rear portion of the light switch lighting apparatus that would be inaccessible to a user when installed. The rear portion includes an electrical block 129 to which mains power may be connected, and optionally routed to other electrical devices. The rear portion also includes user interface element 124A2 which, in the embodiment of FIG. 5B is a biased push button. The housing on which the user interface element 124A2 is provided may also optionally house one or more additional components such as a controller, a communications module, and an energy storage device. To reset the light switch in the embodiment 120A2 of FIG. 5C, a user may, after the light switch has been connected to mains power, remove the light switch from mains power and push the user interface element 124A2 to a depressed position. The user interface element 124A2 may then return to the non-depressed position. The controller of the light switch may recognize the pushing of the user interface element 124A2 to the depressed position and reset the light switch to the factory new state as described, for example, with respect to FIG. 3.

Although FIGS. 5B and 5C are described as rear views of embodiments of a particular light switch 120A1 of FIG. 5A, in other embodiments one or more features of those rear views may be implemented on alternative light switches and/or other lighting apparatus. For example, in some embodiments the "front face" of FIG. 5B and/or FIG. 5C may include a motion sensor, with or without any separate user actuable "light switch" components.

Figure 6:
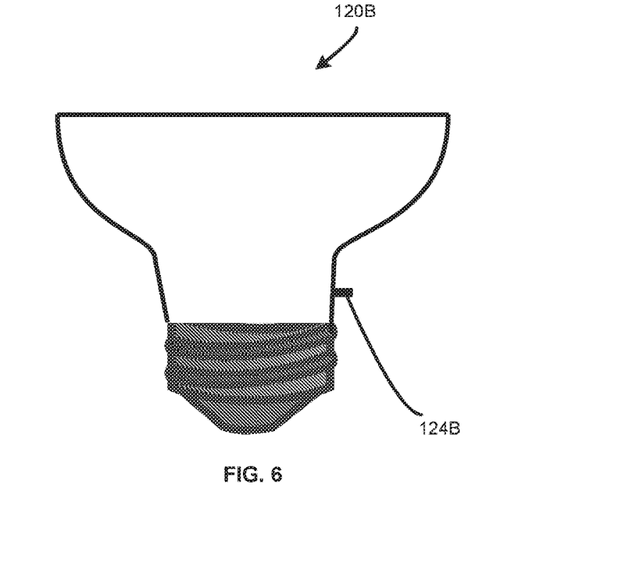
FIG. 6 illustrates a light source lighting apparatus that may be reset to a factory new state according to various embodiments described herein.

FIG. 6 illustrates a light source lighting apparatus 120B that may be reset to a factory new state according to various embodiments described herein. The view of FIG. 6 illustrates a user interface element 124B that may be, for example, a toggle switch. The user interface element 124B may be inaccessible to a user when the light source lighting apparatus 120B is installed in certain environments. The light source 120B may include one or more LEDs and may house one or more additional components such as a controller and a communications module. To reset the light source lighting apparatus 120B in FIG. 6, a user may remove mains power from the light source lighting apparatus 120B and switch the user interface element 124B to another position. A controller of the light source lighting apparatus 120B may recognize this switch and reset the light source lighting apparatus 120B to the factory new state as described, for example, with respect to FIG. 2 or 3. In some embodiments, a controller of the light source lighting apparatus 120B may additionally or alternatively reset the light source lighting apparatus 120B to the factory new state based on a monitoring on/off cycles of power as described, for example, with respect to FIG. 4. In some of those embodiments the user interface element 124B may optionally be omitted.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A lighting apparatus, comprising:
   a communications module;
   a controller programmed to establish a ZigBee factory new connection to a ZigBee network via the communications module when a factory new status of the lighting apparatus is in a set state and to not establish the factory new connection when the factory new status is not in the set state;
   a user interface element coupled to the controller, the user interface element physically actuable between multiple positions; and
   a non-volatile memory to store an indication that the user interface element is in a first position of the multiple positions;
   wherein when the factory new status is not in the set state the controller is further programmed to perform the following operations on reconnection of the lighting apparatus to mains power after being disconnected:
      compare a sensed position of the user interface element to the indication stored in the non-volatile memory;
      determine, based on the comparison, that the sensed position is different than the first position, and
      change the factory new status to the set state in response to the determination.

2. The lighting apparatus of claim 1, wherein the user interface element is located on the lighting apparatus in a position that is inaccessible to a user when the lighting apparatus is installed.

3. The lighting apparatus of claim 2, wherein the lighting apparatus is a light switch.

4. The lighting apparatus of claim 2, wherein the lighting apparatus is a presence sensor.

5. The lighting apparatus of claim 1, wherein the user interface element is a push button that is biased to the first position.

6. The lighting apparatus of claim 1:
   wherein the controller senses the user interface element is in the first position prior to the lighting apparatus being disconnected from mains power and stores an indication of the first position in the non-volatile memory.

7. The lighting apparatus of claim 6, wherein the user interface element is a dip switch.

8. A method of managing connection of an apparatus to a network, comprising:
   connecting an apparatus to a network when a factory new status of the apparatus is in a set state;
   changing the factory new status to not be in the set state in response to connecting to the network;
   sensing a change in the position of a user interface element while the apparatus is disconnected from mains power but powered by an energy storage device, the user interface element being part of the apparatus and being actuable between a plurality of positions; and
   changing the factory new condition back to the set state in response to sensing the change in the position of the user interface element.

9. The method of claim 8, wherein the user interface element is located on the lighting apparatus in a position that is inaccessible to a user when the lighting apparatus is installed.

10. The method of claim 8, further comprising:
receiving power from the energy storage device of the apparatus when the lighting apparatus is disconnected from mains power; and
wherein sensing the change in the position of the user interface element comprises sensing the change in the position of the user interface element when the apparatus is disconnected from mains power.

11. The method of claim 8, further comprising:
sensing the position of the user interface element prior to the apparatus being disconnected from mains power;
storing an indication of the position of the user interface element prior to the apparatus being disconnected from mains power; and
wherein sensing the change in the position of the user interface element following disconnection of the apparatus from mains power comprises determining the position of the user interface element when the apparatus is reconnected to mains power is different from the stored indication of the position of the user interface element prior to the apparatus being disconnected from mains power.

12. A lighting apparatus, comprising:
a communications module;
a controller programmed to establish a ZigBee factory new connection to a ZigBee network via the communications module when a factory new status of the lighting apparatus is in a set state and to not establish the new connection when the factory new status is not in the set state;
wherein when the factory new condition is not in the set state the controller is further programmed to monitor a number of on/off cycles of power provided to the lighting apparatus within a time period and change the factory new status to the set state when the number of on/off cycles satisfies a threshold.

13. A method of managing connection of an apparatus to a network, comprising:
connecting an apparatus to a ZigBee network when a factory new status of the apparatus is in a set state;
changing the factory new status to not be in the set state in response to connecting to the ZigBee network;
monitoring a number of on/off cycles of power provided to the apparatus within a time period; and
changing the factory new status to the set state when the number of on/off cycles satisfies a threshold.

\* \* \* \* \*